Jan. 19, 1932.  W. S. EATON  1,842,342
RADIODYNAMIC ORIENTATION MEANS AND METHOD
Filed March 18, 1929  5 Sheets-Sheet 2
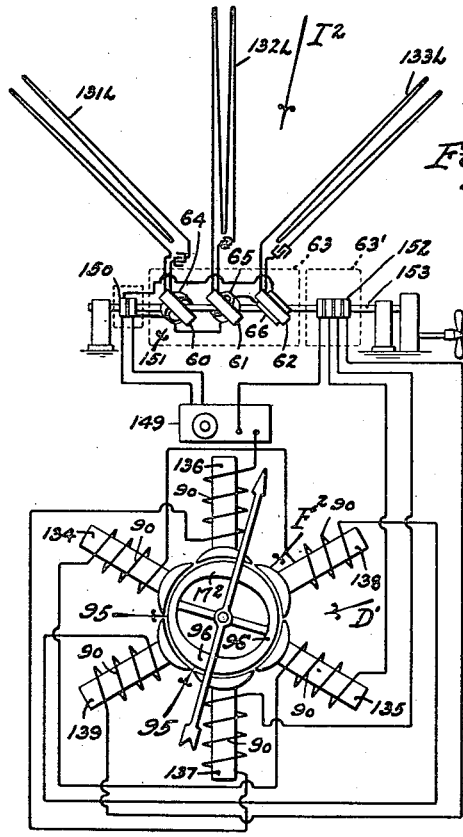
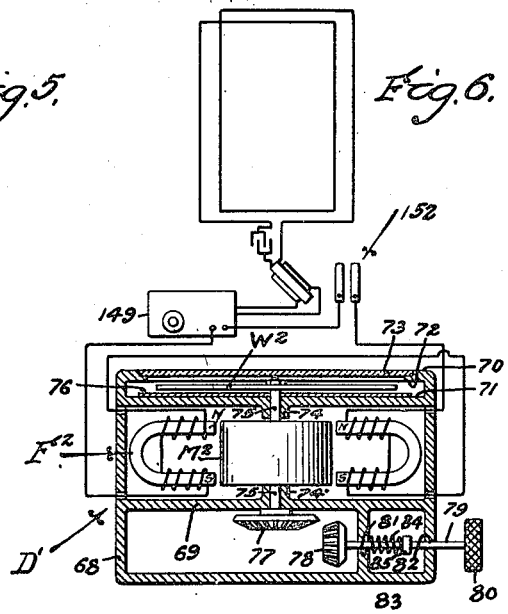
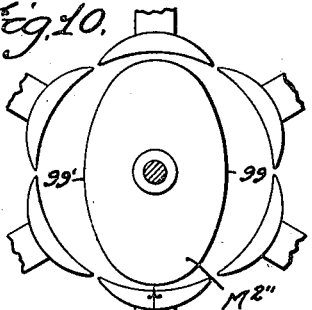
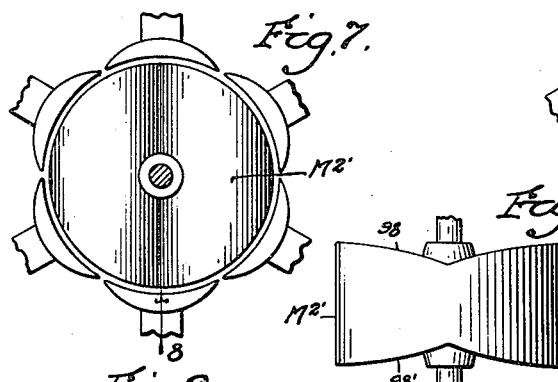
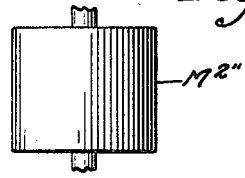
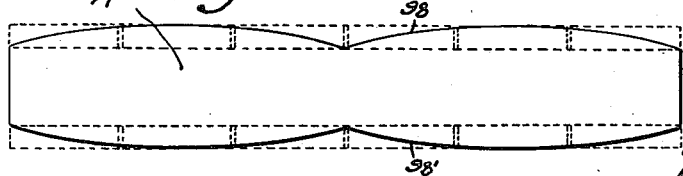
INVENTOR
By WARREN S. EATON
ATTORNEY

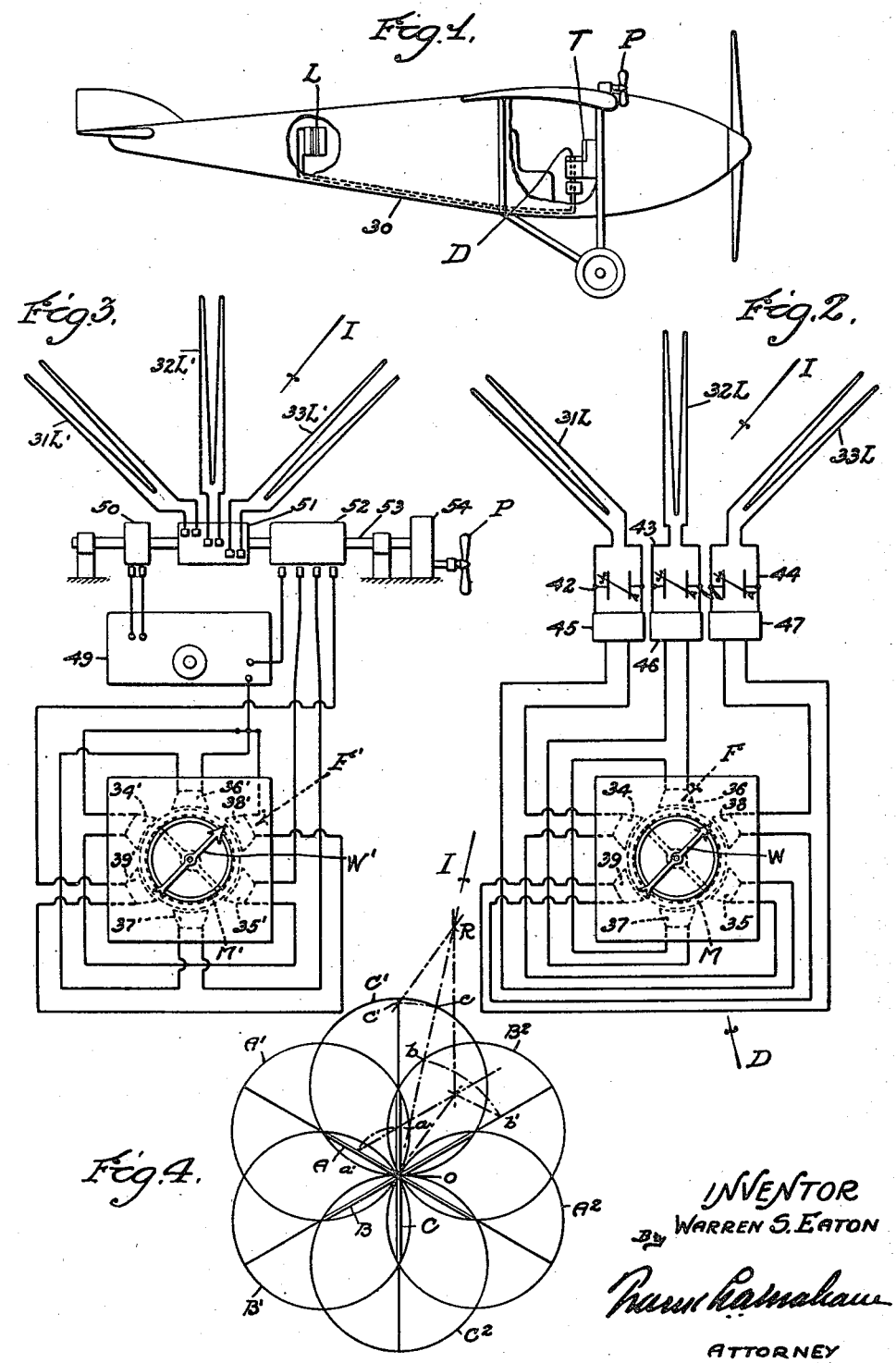

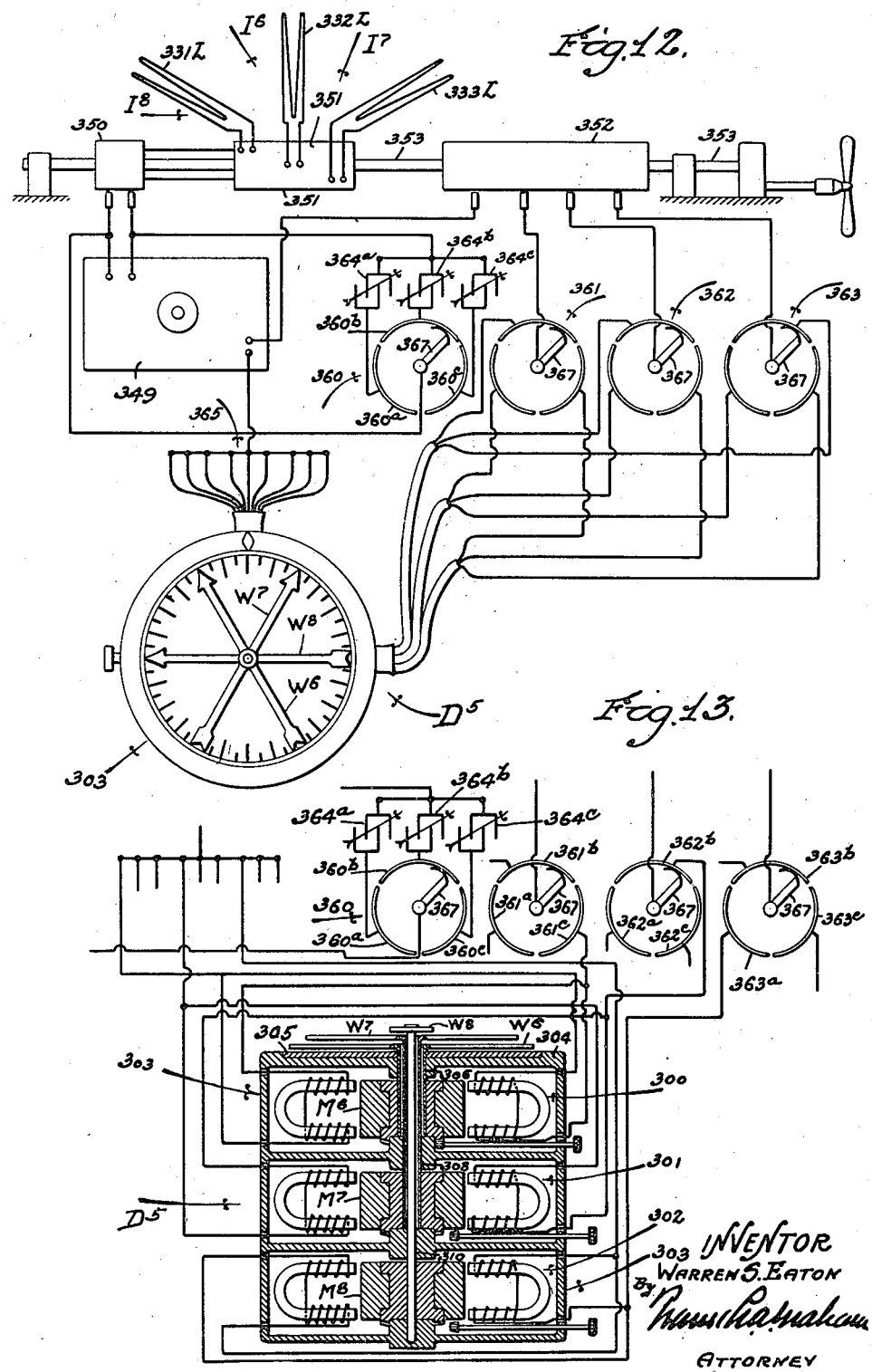

Jan. 19, 1932. W. S. EATON 1,842,342
RADIODYNAMIC ORIENTATION MEANS AND METHOD
Filed March 18, 1929   5 Sheets-Sheet 4
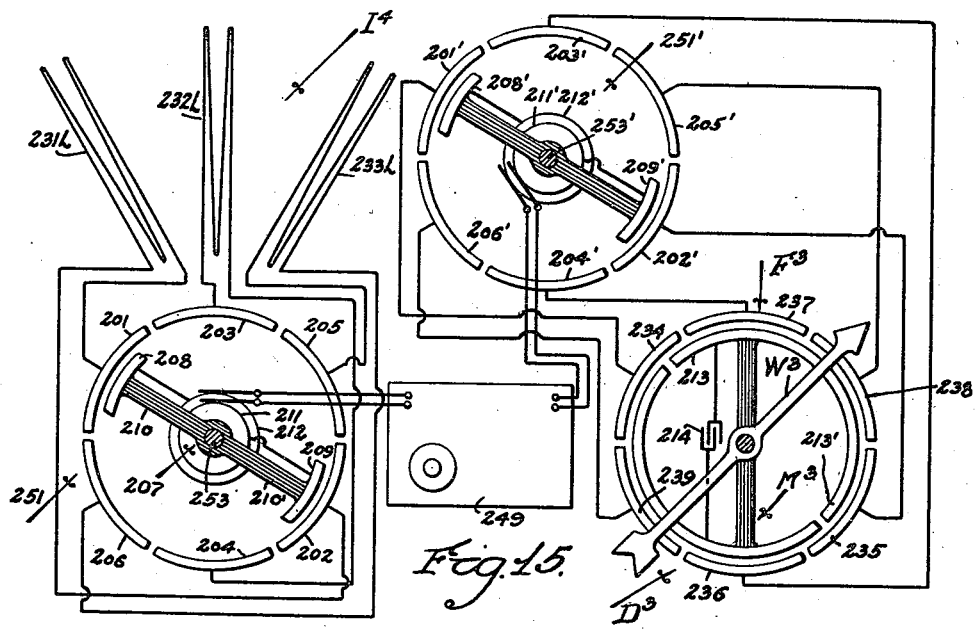
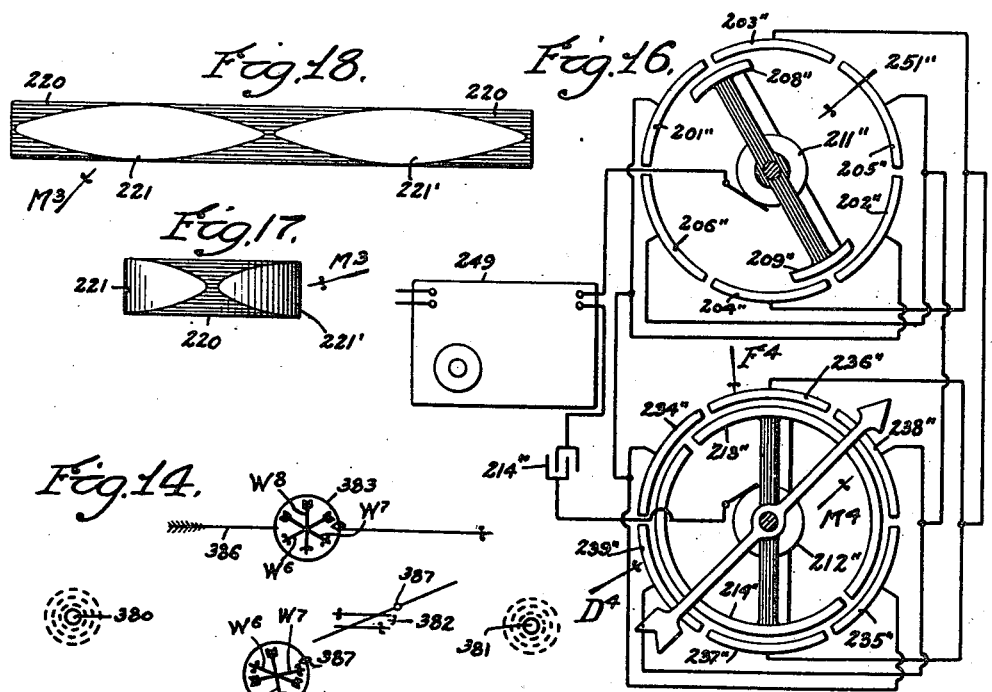

Jan. 19, 1932.  W. S. EATON  1,842,342
RADIODYNAMIC ORIENTATION MEANS AND METHOD
Filed March 18, 1929  5 Sheets-Sheet 5
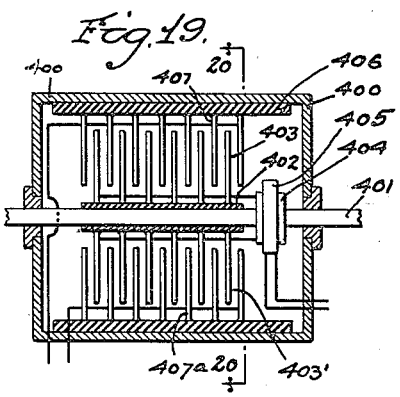
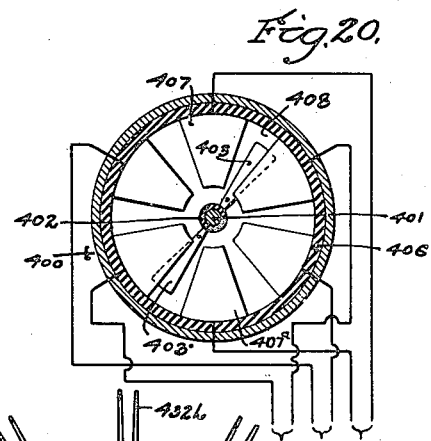
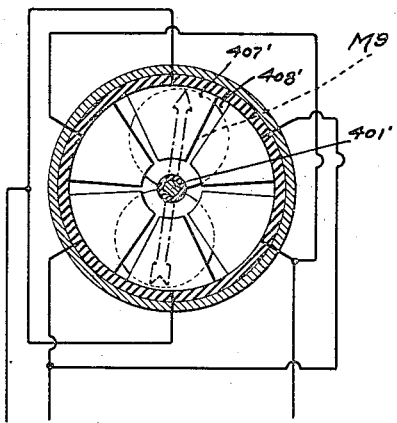
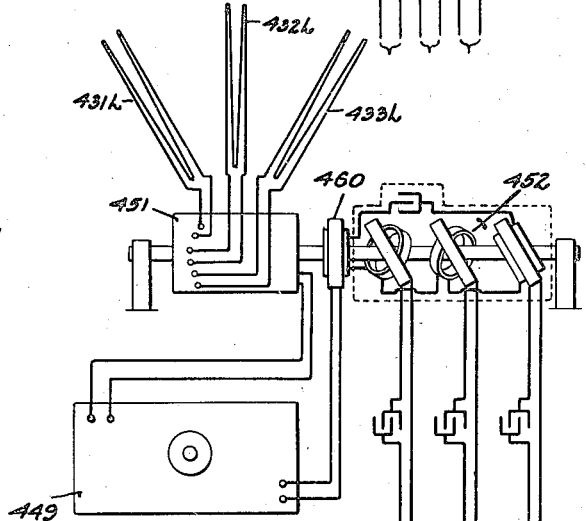
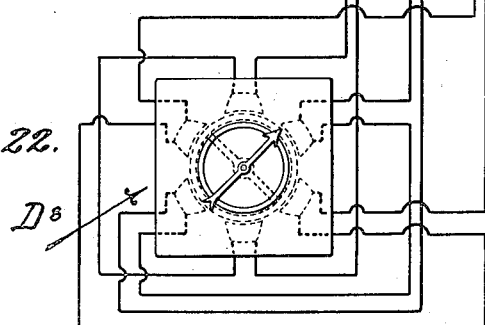
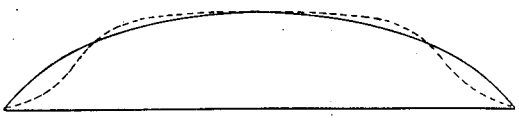
INVENTOR
WARREN S. EATON
By
ATTORNEY Patented Jan. 19, 1932

1,842,342

UNITED STATES PATENT OFFICE

WARREN S. EATON, OF LOS ANGELES, CALIFORNIA, ASSIGNOR, BY MESNE ASSIGN-
MENTS, TO EATON RADIO INSTRUMENT CORPORATION, OF LOS ANGELES, CALI-
FORNIA, A CORPORATION OF CALIFORNIA

RADIODYNAMIC ORIENTATION MEANS AND METHOD

Application filed March 18, 1929. Serial No. 348,031.

This invention relates broadly to an instrument commonly known as the radio compass, which has as its purpose the determination by radiodynamic means of the direction to a radio transmitter.

It is an object of this invention to produce a compass of the class above referred to, which is of such simplicity and stability in construction, and the sensitiveness of which gives results of such accuracy, that the instrument is particularly adapted for and is capable of satisfactory and reliable use in both aerial and nautical navigation.

Another object of this invention is to produce a radiodynamically controlled compass which automatically indicates within a complete radius of three hundred sixty (360°) degrees, the exact line of direction between a point and a transmitting station.

It is a noteworthy feature of this invention that the results obtained are not dependent upon the skill of an operator, but that the instrument may embody a suitable needle and dial, which cooperate to designate accurately the line of direction on which the radio wave for which the set is tuned, is approaching the set.

It is another noteworthy feature of this invention that the sensitiveness of the instrument is such that a stationary instrument of this character may be used to follow a transmitter which is traveling at a high rate of speed, a feature which is particularly useful in aerial navigation both for commercial and war time use.

These objects, as will be more fully described, are accomplished by using a set of three or more antennæ in fixed angular relation to each other, in which the resultant force set up by the incoming wave is resolved along a line which is in predetermined relation with the direction of the incoming wave, by means of a plurality of electro-static or electro-magnetic field pieces which are arranged in predetermined relation to, preferably in parallelism with, the respective antennæ.

The details in the construction of this invention, and further objects attending its production, will be better understood from the following description of the accompanying drawings in which Fig. 1 is a more or less diagrammatic view of an airplane having parts broken away and illustrating the manner in which the invention is used in connection with this type of craft.

Fig. 2 is a diagram showing one form of the invention and illustrating the basic principle upon which this invention operates.

Fig. 3 is a diagrammatic view similar to Fig. 2, but showing a preferred form of the invention in which a single tuning device is used to control the current induced in the three antennæ.

Fig. 4 is a diagram which will be used to describe the theory upon which this compass operates.

Fig. 5 is a diagrammatic view illustrating a preferred form of the invention in which the operation of the compass is electromagnetically controlled.

Fig. 6 is a diagrammatic view illustrating a part of the unit shown in Fig. 5 and may be considered as showing an elevational section of a radio compass unit in which the compass element is controlled electromagnetically.

Fig. 7 is a plan view illustrating a form of flux carrying member.

Fig. 8 is an elevational view illustrating the flux carrying member illustrated in Fig. 7 and may be considered as having been taken substantially in the direction of the arrow 8 in Fig. 7.

Fig. 9 is a developed elevation illustrating the manner in which the periphery of the flux carrying member illustrated in Figs. 7 and 8 is formed and positioned relative to the poles of the field pieces.

Fig. 10 is a plan view similar to Fig. 7 but illustrating another form of flux carrying member positioned concentrically with the field pieces.

Fig. 11 is an elevational view illustrating the flux carrying member shown in Fig. 10 and may be considered as having been taken substantially in the direction of the arrow 11 in Fig. 10.

Fig. 12 is a diagrammatic view illustrating the manner in which a plurality of radio compass elements of the class herein described may be used in tandum and in combination with a single set of antennæ and tuning means for indicating the direction to a plurality of sources of radio waves.

Fig. 13 is a diagrammatic view illustrating a circuit similar to that shown in Fig. 12 but showing the compass elements in sectional elevation for the purpose of more clearly illustrating this construction.

Fig. 14 is a diagrammatic view illustrating the manner in which the form of the invention shown in Figs. 12 and 13 may be used in navigating an airplane or other vehicle relative to two or more transmitting stations.

Fig. 15 is a diagrammatic view illustrating the manner in which this invention may be incorporated in an electrostatic system instead of an electromagnetic system.

Fig. 16 is a diagrammatic view illustrating a system similar to that shown in Fig. 15 but showing an alternative manner in which the various elements of the system may be electrically connected.

Fig. 17 is an elevational view showing a form of flux carrying member which may be used in connection with the electrostatic system shown in Figs. 15 and 16.

Fig. 18 is an elevational view showing the development of the flux carrying member illustrated in Fig. 17.

Fig. 19 is an elevational section showing a modified form of electrostatic commutator unit which may be used in combination with the radio compass system embodied in my invention.

Fig. 20 may be considered as a sectional elevation taken substantially in a plane represented by the line 20—20 in Fig. 19 and illustrates further details in the construction of an electrostatic commutator indicating the manner in which the various elements of this commutator are electrically connected.

Fig. 21 is a plan view illustrating the details in the construction of a modified form of electrostatic compass element.

Fig. 22 is a diagrammatic view illustrating an assembly of elements embodied in a radio compass system incorporated in my invention.

Fig. 23 is a diagram illustrating the manner in which the face or periphery of a flux carrying member is altered to compensate for the characteristics of the receiving set in connection with which the compass is being used.

Before entering into the description of details in the construction of the various embodiments of the invention, it might be well to explain briefly the theory upon which this radio direction indicating system operates. It is commonly known in the art that the intensity of the signal received or the current set up in a receiving set equipped with a loop or so called directional antenna will be a maximum when the loops are in direct alignment with the carrier waves and that this intensity will have a minimum value when the loops are normal or at right angles to the direction of the carrier waves.

When a loop antenna of the class above-described is rotated about its axis and the electro-motive force induced in the loop is plotted in a polar diagram against the angular position of the loop, the resultant curve will be the "figure 8" which is known as the bilateral characteristic curve of the loop.

For a given loop, therefore, the intensity of an induced current resulting from a radio wave approaching the loop at a given angle will be proportional to the distance from the center of the loop to the point at which the directional line from the transmitter to the center of the loop cuts the bilateral characteristic curve.

If a series of loops are arranged in fixed angular relation with each other as indicated at A, B, and C in Fig. 4, the bilateral characteristic curves of these loops will be as indicated at $A_1 A_2$, $B_1 B_2$, and $C_1 C_2$ respectively.

Assuming that an incoming wave I is approaching the common center $o$ of the three coils, the induced current in the loop A will be proportional to the vector $ao$, that in loop B will be proportional to $bo$, and that induced in loop C will be proportional to $co$.

These electric "force" vectors may be resolved into the line of their respective coils as indicated at $a'o$, $b'o$ and $c'o$ respectively, and a final resolution of the forces may be made giving the common resultant $Ro$ which lies along the direction line of the incoming wave I.

If the resolution of forces described above is considered as taking place in a series of electrostatic or electromagnetic field pieces, which are arranged in oppositely disposed pairs or sets in substantial parallelism with the three directional antennæ, it will be apparent that the resultant force $Ro$ may be employed to swing a suitable flux carrying member into exact alignment with the incoming wave.

From the foregoing general explanation, it will be understood that the under-lying principle of the present invention is the utilization of the received electro-magnetic energy to create fields of force the effect of which has predetermined directional relation to the source of the received energy, and then the utilization of the effect of said fields of force to indicate and register the line direction between the source and the point of reception of the broadcast energy. This basic principle is claimed specifically in the present application. In my application, Serial No. 355,015, filed April 15, 1929, I have claimed another aspect of this same under-lying principle, while in my applications, Serial No. 224,997, filed October 8, 1927, and Serial No. 256,228, filed February 23, 1928, I have disclosed and claimed the use of this underlying principle for accomplishing other results. The broad aspect of the present invention is claimed in my application, Serial No. 554,307, filed July 31, 1931.

It might be mentioned at this time that it is preferable to use three or more antenna loops (three being the preferred number) for, although two loops arranged substantially at right angles with each other will produce a resultant field, it will be readily apparent that with only two loops the flux carrying member will be rotated into any one of the four quadrants and therefore not indicate true line direction.

Fig. 1 illustrates the manner in which an airplane 30 may be equipped with a preferred form of the invention. A directional antenna system such as a set of loops is generally indicated at L, the receiving or tuning set is indicated at T, and the indicator or compass is generally indicated at D. A small wind-driven propeller or motor unit indicated at P is provided for operating a commutating organization as will be hereinafter more fully described.

It is well known to those familiar with the art that in either an electrostatic or an electromagnetic field, the feature of attraction and repulsion between surfaces or poles of unlike and like sign may be employed to produce movement to a "rotor" or flux carrying member.

It is an object of this invention to produce a system in which the indicator may be operated electrostatically or electromagnetically, and for this reason the term, "flux carrying member", as used in the specification and claims, unless otherwise designated, may indicate either an electromagnetic or an electrostatic flux carrying member. In the former case, the member would be composed of magnetically attracted or repelled material, and in the latter case it would correspond to a movable condenser plate or set of such plates. Likewise, the term "field pieces" will be used broadly to designate either electromagnetic or electrostatic field pieces unless otherwise designated.

Fig. 2 illustrates a radio direction indicator, embodying my invention. In this figure, the direction indicator, D, is illustrated as being associated with a set of three directional antennæ 31L, 32L and 33L.

As illustrated in Fig. 1, these antennæ may be secured within the fuselage of the airplane 30, or may be located at any other point on the airplane, such as a stream-lined housing (not shown).

The direction indicator or radio compass element generally indicated at "D" in Fig. 2 is illustrated as embodying a flux carrying member M upon which an indicator or arrow W is mounted, and a series of field pieces F which are arranged in pairs designated by reference characters 34, 35; 36, 37; and 38 and 39 respectively. It will be noted that the antennæ 31L, 32L and 33L are substantially parallel with the respective field pole pieces 34, 35; 36, 37; and 38, 39 respectively. It is, however, to be understood that parallelism between the field pieces and their respective antennæ is not essential as the indicator can be adjusted with respect to the flux-carrying member to compensate for any angular differences, parallelism being shown only for convenience.

No particular apparatus has been shown for either receiving, tuning or amplifying the broadcast wave. The antennæ, of course, provide the inductance, capacities are shown at 42, 43 and 44, and amplifying means at 45, 46 and 47. The different antennæ in this form of the invention are illustrated as being associated with different capacities and with different amplifying units and it is necessary for the proper operation of a system of this character that the amplification in all of the units be substantially uniform and equal.

Although it is possible to synchronize the tuning mechanism so that all three of the sets might be operated from a single control, a system of the character shown in Fig. 2 is still confronted with the variation in amplification properties of the individual sets, which if not kept in proper balance would naturally introduce an error into the resultant reading indicated by the indicator.

To overcome this objection the broadcast wave received by the directional antennæ may be tuned and amplified in a single receiving set in which any fluctuation in amplification will have an equal effect upon all of the field pieces. This is accomplished by means of input and output commutators operated in synchronism and arranged in a manner such that each set of field pieces receives an independent momentary excitation from its corresponding antenna during the rotation of the commutator shaft.

Various forms of commutating devices may be employed in a system of this character. In my co-pending application, Serial No. 322,338, I disclose an inductance commutator which is particularly useful in connection with alternating current, and in my application Serial No. 322,337, I disclose a contact commutator, provided with resistance elements designed to eliminate the "kick back" against the tubes in a set in which the current is rectified from A. C. to D. C. It will be understood of course, as has been suggested heretofore, and as will be hereinafter more specifically pointed out, that a capacitance commutator may also be employed in a unit of this character.

Fig. 3 illustrates the manner in which a single receiving and amplifying set 49 may be used in conjunction with commutators 50, 51 and 52, mounted upon a commutator shaft 53, to supply momentary excitation from each of the antennæ 31L', 32L' and 33L' to the sets of field pieces 34', 35'; 36', 37', and 38', 39' respectively.

The commutator shaft 53 is rotated at a sufficient speed by means such as the propeller P and reduction gears 54 to establish a resultant field between the field pieces F' which cooperates with the moment of inertia of the flux carrying member M' to hold the indicator W' substantially stationary.

It will be understood from Fig. 3, that the commutator 50 delivers the three momentary excitations from the commutator 51 to the tuning and amplifying set 49, and that the commutator 52 is effective to simultaneously form momentary connection between the radio set and the set of field pieces which corresponds to the particular antenna introduced into the circuit by commutator 51.

In either one of the sets shown in Fig. 1 or Fig. 2, it will be apparent from the above reasoning that if the incoming wave approaches the antenna unit in the direction of the arrow I, that the resultant field set up in the area between the pole pieces F or F' will be effective to swing the flux carrying member M or M' and the indicator W or W' carried thereby into parallel relation with the direction of the wave emanating from the transmitter.

Figs. 5 and 6 illustrate the construction of another form of electromagnetically operated direction indicator or radio compass, particularly adapted for use in connection with a tuning and amplifying set 49 which is designed to deliver direct current to the indicating unit. In Fig. 5 the antennæ 131L, 132L, and 133L are illustrated as being connected with the stationary coils 60, 61 and 62 of an inductance commutator 151, similar to that disclosed in my aforementioned application Serial No. 322,338, which is illustrated as being enclosed within a Faraday cage 63. A series of angularly disposed rotating inductance coils 64, 65 and 66 mounted upon the commutator shaft 153, are connected in series with the contact (or inductance) commutator 150, to deliver momentary excitation from the antennæ to the receiving set 149.

The field piece commutator 152 is illustrated as being of the same form as the resistance contact commutator disclosed in my application Serial No. 322,337, which as mentioned above is designed primarily for use in connection with a set having a D. C. output, but of course, may be used with alternating current. This commutator 152 is illustrated as being enclosed in a Faraday cage or other suitable shield box 63'.

In Fig. 6 the indicator unit D' is illustrated as including a casing 68 provided with a sub-base 69, and a cap 70. The cap 70 may be held in the casing in any suitable manner and is illustrated as including a plate 71, formed with a flange 72 upon its upper edge which is adapted to receive a transparent covering plate 73. The cap plate 71 and the subbase 69 are illustrated as being provided with central hub sections 74 and 74', which are adapted to receive a rotatable shaft 75, which carries a magnetically operated flux carrying member $M^2$. An indicator scale 76 is secured to the cap plate 71 and an indicator $W^2$ is secured to the upper end of the shaft 75.

The lower end of the shaft 75 is provided with indicator adjusting means illustrated as embodying a friction cone or bevel gear 77, which is adapted to receive optional rotation from a cooperatively formed cone or bevel gear 78, mounted upon the inner end of a horizontal shaft 79, the outer end of which is provided with a finger piece 80. The shaft 79 is supported in suitable bearing apertures 81 and 82 formed in the casing and in a partition member 83 respectively. A spring 84 and a collar 85 cooperate to hold the cone or bevel gear 78 in a disengaged relation with cone or bevel gear 77. This adjusting organization is provided for the purpose of adjusting the position of the needle so that the feather end is away from the transmitting station, it being understood that with a symmetrical rotor, the needle may be 180° out of adjustment.

The field pieces $F^2$ in the form of the invention shown in Figs. 5 and 6 are illustrated as embodying horse shoe shaped "core" members which are wound with wire coils 90, and the polarity of these magnetic field pieces or poles will depend upon the direction of flow of electricity through the wire coils.

It will of course be noted as was pointed out in connection with Figs. 1 and 2, that the field pole pieces are arranged in sets as indicated by reference numerals 134, 135; 136, 137; and 138, 139 respectively, and that each set of pole pieces will receive momentary electrical excitation from its corresponding antenna once during each rotation of the commutator shaft 153.

The current is directed through the coils on the field pieces so that diametrically arranged and aligned pole pieces have the same polarity. In other words north poles will face north poles and south poles will face south poles as illustrated in Fig. 6. This is done for several reasons, one being to provide a complete flux flow through the individual field pieces and pole pieces. A second reason is in order to obtain an automatic rotative effect of the indicator relative to the scale as hereinafter more fully described.

In the operation of the system indicated in Figs 5 and 6, assuming the broadcast wave to be approaching the antenna unit in the direction of the arrow I2, it will be understood that each of the three sets of poles 134, 135; 136, 137; and 138, 139 will be successively and momentarily magnetized by the induced current coming from the respective antennæ 131L, 132L and 133L, such current being amplified (and in the form illustrated, rectified) before reaching the coils 90. The upper poles of the field pieces (in the illustrated case the north poles) being opposed, as are likewise the lower or south poles, the magnetic flux will flow between the upper and lower poles of each field piece, and the flux carrying member M2 is formed in a manner such that it will equalize the air gap density between the several north and the south poles. There will therefore be a rotative force exerted upon the flux carrying member M2 by the field pieces, and the forces from the combined system of pole units, will resolve into a resultant along the line of two diametrically opposed points, which line, when the system is properly arranged, is parallel with the incoming wave I2.

It was mentioned above that the flux carrying member M2 is formed in a manner such that it will equalize the air gap density between the various sets of north and south poles. The purpose of this is to obtain a rotative effect upon this member, and the formation or construction of the member M2 may be made in various manners to accomplish this result.

It is well known to those familiar with the art, that the linear characteristic curve of a loop antenna is substantially a cosine curve, the resultant current induced in such an antenna and amplified in a receiving set varying more or less with the individual characteristics of the set, and it has been found desirable for most accurate and efficient results to form the flux carrying member M2 in a manner such that the air gap density which is governed by member M2 will vary with the cosine curve. This is most easily established by cutting or otherwise forming the member M2 to conform with a cosine curve, or in cases where extreme accuracy is desired, a cosine curve corrected by varying its shape to compensate for the characteristics of the set. The latter case will be described later in the specification.

In Figs. 5 and 6 the flux carrying member M2 is illustrated as being in the form of a drum 95, the periphery of which has a thick section at 96 and a thin section at 96'. The variation in thickness of the periphery of the drum conforms substantially to a cosine curve as best illustrated in Fig. 5.

Figs. 7 to 9 inclusive illustrate a modified form of rotor or flux carrying member M2' which is made from a substantially solid cylinder having the top and bottom sections, which are parallel with the pole faces, cut away as indicated at 98, 98' in Figs. 8 and 9. Fig. 9 illustrates a development of the periphery of the rotor M2' and shows in dotted lines the manner in which the pole faces are arranged relative to the curved portions of the rotor.

Fig. 10 illustrates another form of rotor member M2" in which the air gap density is varied by making the rotor substantially oval shape, the two edges 99, 99' conforming to the characteristic curve mentioned above.

It has been heretofore mentioned from time to time that capacity might be employed instead of inductance for commutating alternating current in the system and in the event the output of the receiving set is not rectified, the compass element itself may be operated by capacity and Figs. 15 to 18 inclusive illustrate the electrical circuit comprised in a system in which the commutating and compass elements are all operated electrostatically. The systems shown in Figs. 15 and 16 are similar in all respects, with the exception of the connections between the field piece elements F3 and F4 and the "flux carrying members" M3 and M4 relative to the field piece commutators. Receiving and tuning means are therefore shown only in Fig. 15.

In this form of the invention the receiving antennæ 231L, 232L and 233L are connected with capacity plates or segments 201 202; 203, 204; and 205, 206 respectively of a commutator 251. The commutator 251 embodies a rotor or flux carrying member 207 mounted upon a commutator shaft 253, such rotor comprising oppositely disposed condenser plates 208, 209 which are separated by insulating spokes 210, 210', and are connected to suitable slip rings or inductance rings 211 and 212 respectively.

It will be apparent that as the rotor revolves in the electrostatic field created by the plates 201 to 206 inclusive, that a potential difference will be established between the slip rings 211, 212 by reactance during the passage of the rotor through the field of the plates, and that this potential will correspond to the induced current in the corresponding antenna.

The slip rings 211 and 212 are connected through suitable brushes with a suitable receiving and tuning set indicated at 249. The output of the set is connected to slip rings 211' and 212' embodied in a capacity commutator 251' which is similar in all respects with the cummutator 251 and is mounted on the commutator shaft 253 or is otherwise synchronized with commutator 251. Similar reference numerals distinguished by a prime mark are used to designate corresponding parts of the commutator 251'.

The compass or indicator element D3 is illustrated as comprising field pieces F3 in the form of capacity plates 234, 235; 236, 237; and 238, 239 and these plates are illustrated as being connected with corresponding plates 201', 202'; 203' 204'; and 205', 206' in the commutator 251'. It will be understood, as has heretofore been pointed out from time to time, that it is important to maintain parallelism between the antennæ 231L, 232L, and 233L; the reactance plates 201, 202; 203, 204; and 205, 206 in commutator 251; and the field piece reactance plates 234, 235; 236, 237; and 238, 239 of the compass D3. Under these circumstances, it will be apparent that the currents induced in the system by an incoming wave 14 will set up a resultant reactance in the compass D3, which will be effective to rotate the rotor M3 into the position indicated by the indicator W3.

The rotor M3 comprises two semi-cylindrical capacity segments 213, 213', and in the system shown in Fig. 15 it will be understood that at any given instant the opposite plates, as 238 and 239, will be oppositely charged. This of course means that plate segments 213 and 213' will carry opposite charges, which necessitates positioning a condenser 214 between the plates 213 and 213'.

In Fig. 16 the commutator and compass elements 251'' and D4 respectively are the same as shown in Fig. 15, the only difference between this construction and that shown in Fig. 16, being that the opposite plates 201'', 202''; 203'', 204''; and 205'', 206'' are connected with each other in pairs so that opposite plates are similarly charged.

Likewise the field piece plates 234'', 235''; 236'', 237''; 238'', 239'' are connected in pairs and each set of field piece plates is connected with its corresponding set of commutator plates. In such a system similar fixed plates in the system will carry similar charges at any given instant, the difference in the intensities of the charges being effective to establish a resultant reactance or electrostatic field as mentioned above.

It will be apparent in a circuit as described above, that the commutator rotor condenser plates 208'' and 209'' and the plates 213'' and 214'' in the flux carrying member of the indicator will be similarily charged, the charge being opposite to that on the stationary field pieces. It is necessary therefore, to complete the circuit, to connect the two plates 208'' and 209'' with a single slip ring 211'', and to connect the plates 213'' and 214'' with a similar slip ring 212'', the two slip rings 211'' and 212'' being connected through a condenser 214'' by means of suitable brushes. By connecting the elements of the system in this manner, the necessity of providing a condenser in the rotor of the compass member is eliminated.

Figs. 17 and 18 illustrate the manner in which the rotor M3 may be constructed to provide a variable air gap density or electrostatic tension in the dielectric in the reactance field. Fig. 17 illustrates the rotor M3 as comprising a cylindrical non-conducting member 220, the face of which is provided with conducting plates 221 and 221', cut to conform to the cosine curve characteristic mentioned above. Fig. 18 is a developed elevation of the periphery of the cylinder shown in Fig. 17.

The form of the device shown in Figs. 12 and 13 has among its objects, the provision of means whereby any desired number of stations may be tuned for, and angular bearings taken on each of said stations. Such a device greatly facilitates position finding, course plotting, drift angle and wind velocity determination, and will enable the pilot to obtain complete information for navigation.

One of the most difficult features of present day navigation whether it be by boat or in the air is to determine the exact drift angle and the means about to be described effectively and accurately determines such angle. The direction indicator generally indicated at D5 in the form of the invention shown in Figs. 12 and 13 embodies three sets or banks of field piece members, the banks being indicated at 300, 301, and 302, which banks are separately placed within compartments of a casing 303, the casing being preferably formed of some substance substantially non-magnetic in character. This casing is also shown as being provided with a cap member 304, carrying an indicator dial 305. All of the banks are similar in construction to the bank shown in Figs. 5 and 6. The bank 300 controls movement of the tubular shaft 306, which carries an indicator W6. The bank 301 controls tubular shaft 308 which carries an indicator W7 and the bank 302 controls shaft 310 carrying indicator W8.

Sets of antenna coils 331L, 332L and 333L are connected with a suitable commutator 351 through which an intermittent current flow is established to a receiving and amplifying set indicated at 349 through a commutator 350. The antennæ and the amplying means are of course associated with a field pole commutator 352 mounted on a commutator shaft 353 and adapted to effect momentary flow of current through a connected bank of field poles in the manner to be hereinafter described.

It was mentioned above that the excitation for the three banks of field pieces 300, 301 and 302 is to be provided from three different radio waves, the direction of such waves being indicated by the arrows $I_6$, $I_7$ and $I_8$ and although three sets of antennæ and three tuning and amplifying sets may be used for tuning and amplifying these waves, it is considered preferable for compactness to use a single set of antennæ and a single receiving and amplifying set, the input to the receiving set being commutated intermittently through separate tuning means as generally indicated at 360, and the output of the set being commutated through correspondingly synchronized "bank" commutators 361, 362 and 363, the elements of which are connected to the separate banks 300, 301 and 302.

The tuning commutator 360 and the bank commutators may be of any preferred form such as the inductance or capacity commutators described above but for the purpose of description are illustrated as comprising contact commutators which are synchronized with each other in any suitable manner as by mounting them upon a common shaft. The illustrations being more or less diagrammatic the manner of synchronizing the commutators 360 and 361 and 362 and 363 is not shown. It will be understood that these commutators are designed to be operated much more slowly than the commutators 350, 351 and 352 but may be driven from the shaft 353 by means of suitable reduction gears, not shown, and it is important for successful operation of the instrument that the speed of the tuning commutator and its associated elements bear a given ratio to the number of banks of field pieces in the compass unit, for instance, in the use of a system embodying three banks of field pieces, the speed of tuning commutator and the speed of the "receiving commutator" should bear the ratio of 1–3, 1–9 etc.

The elements 360a, 360b and 360c of the tuning commutator are connected to variable tuning condensers 364a, 364b and 364c, which are used to tune the input current to the set receiving the broadcast waves I6, I7 and I8 respectively. The induced current thus tuned passes through the receiving set 349, one side of the output being connected to the field pole pieces in the manner similar to the description of Figs. 5 and 6, as indicated at 365, and the other side of the output is, of course, connected through commutator 352 to the commutator members 361, 362 and 363.

Each parallel set of conducting segments (as 361a, 362a and 363a) is connected with one bank of field pole pieces. This feature is perhaps best illustrated in Fig. 13, wherein it will be noted that segments 361a, 362a and 363a are connected with bank 302; 361b, 362b and 363b with bank 301; and 361c, 362c and 363c with bank 300. Inasmuch as the indicator element D5 is shown in section in Fig. 13, the completed circuits are shown only from segments 361c, 362b and 363a respectively.

It will be understood from the above description that when the brushes generally indicated at 367 are synchronously rotated, the set will be intermittently tuned and connected with the respective banks of field pieces, 300, 301 and 302, and from the prior description of the operation of the individual banks, (it being understood that contact may be established for several seconds in each case) it will be apparent that each of the banks will be effective to position its pointer in alignment with its respective incoming wave.

The moment of inertia of the rotors or flux carrying members $M_6$, $M_7$ and $M_8$ maintains any one rotor substantially stationary while the excitation current is in either of the other two banks of field pole pieces. If desirable, the rotors may be damped by immersing them in oil or the like.

It will also be apparent from the foregoing discussion that the indicator $D_5$ is not necessarily confined to the specific construction shown in Figs. 12 and 13, but that capacity compass units may be substituted for the magnetic units shown.

Two of the direction indicator banks may be so tuned that an exact straight course between two radio transmitting stations may be navigated. The indicators of such banks, when parallel, would indicate a true on course position. The angle of the vehicle axis in relation to the parallel indicators would also give the exact drift angle of the vehicle. If the indicators were not parallel, an off course position would show. The direction to the true course would lie between the directions indicated by the indicators. When on an off course position, a bearing or angle can then be taken with either of the banks or with the third bank by tuning in on a third station which would enable establishing an exact position. Two such point readings, noting the plane's axial deflection angle taken at short intervals, would establish the drift angle and course navigated. Stationary positions may be determined by setting one of these instruments in a fixed position, then tuning in a number of stations noting the angular bearings, knowing the distances between the stations and their angular relation to each other completes the necessary information for establishing the point.

It is obvious that the broadcasting stations for the use of this instrument could be automatic and unattended.

Referring to Fig. 14, an actual illustration of the method of using the device shown in Figs. 12 and 13 is as follows:

If a course between two stations, 380 and 381, is to be navigated, the pilot should, before commencing the trip, tune for stations 380 and 381 on two of the banks. The adjusting means (such as the friction cone system described in connection with Fig. 6) for both said banks would be operated so that the indicators would be revolved to the end that the arrows would point in the direction of the respective stations tuned for on its controlling circuit. The indicator W6 will always point toward the station 380 and the indicator W7 will point to the station 381. The relative position of these two indicators will then at all times denote the position of the instrument relative to the two stations. If the position is on the course as shown at 382, the indicators will be parallel. If the indicators are as shown in 383, an off course position to the left will be denoted by the subtended angle between the said indicators, or if the position of the vehicle was 384, the angle between the indicators would show an off course position to the right.

Accurate maps are readily obtainable and the positions and distances between all existing radio broadcasting stations may be accurately determined, and by using this information and the science of triangulation by locating any three stations, as for instance shown at 380, 381 and 385, an exact location of the vehicle being navigated can be determined.

From this information, a course may be plotted and navigated between points that do not lie in line with any two stations. This is accomplished in a manner similar to that previously described for navigation between two stations. That is to say, off course position will be indicated by the subtended angles between the indicators. For instance, as has been shown in Fig. 14, course 386 indicated by the arrow is to be navigated. Position 383 with the subtended angles between the indicators would determine a definite position on and distance covered along the course. If position 384 was indicated, the off course distance and direction may be determined by triangulation and observation of the subtended angles between the indicators. The plotting of consecutive determined positions on a map will always show the course pursued where no previous course to be followed has been indicated.

The diamond point 387 on the indicator scale, which lies on the longitudinal axis of the vehicle, will bear an angular relation to the indicators whether there be one or more. This angular relation, if on course position 382, will show the drift angle. Using this and the velocity as shown by a speed indicator on said vehicle, the resultant angular velocity of the medium navigated may be determined as well as the velocity and distance on the course navigated. If an off course position 384 is indicated, the noting of the angular position indicated at two such positions will determine the course followed and the angle of the drift.

Figs. 19 and 20 illustrate a modified form of reactance or capacity commutator which is of the parallel plate construction and in which reference numeral 400 indicates a liquid tight case which is arranged to receive a central rotating shaft 401 provided with a non-conducting or insulating sleeve 402, which carries two diametrically disposed sets of vanes 403 and 403′. The vanes in each set are all connected with each other and with a suitable commutator ring illustrated as comprising an inductance coil 404. A stationary secondary inductance 405 is arranged concentric with the coil 404, and is adapted to deliver pulsating current induced in the vanes from the commutator.

The inner surface of the casing 400 is provided with a suitable insulating surface 406, or the casing is preferably made of non-conducting material, and a plurality of diametrically opposed sets of stationary condenser plates 407 and 407a are mounted in the non-conducting periphery.

The sets of plates 407 and 407a are connected in pairs as best illustrated in Fig. 20 and for most efficient operation, the casing is filled with a suitable dielectric such as oil.

It will be noted in Fig. 20 that the rotating plates 403 are made slightly narrower than the spaces 408 between the stationary plates 407. This obviates the possibility of the rotating plates being in the plane of action of any two sets of stationary plates at a given instant.

Fig. 21 is a plan view illustrating the manner in which a reactance compass unit may be constructed in a manner similar to the commutator shown in Figs. 19 and 20.

This construction is substantially the same as that described above, except for the fact that the spaces 408′ between the stationary plates 407′ are made narrower than in the commutator, and the rotor or flux carrying member M9 is made to conform more or less to the figure of 8 or bilateral characteristic curve of a loop antenna.

It will also be understood by those familiar with the art that for extreme accuracy the shape of the plates on the rotors M3 and M9 may be designed to compensate for the voltage square factors in condensers.

Fig. 22 illustrates a compass system which may be considered as embodying a commutator 451 and compass D8 of the types shown in Figs. 20 and 21 respectively. This system is designed to operate on alternating current entirely, that is, the current is not rectified in the receiving set 449. It will be noted that there are no contact commutators in this unit. Current coming from the antennæ 431L, 432L and 433L is delivered to the set 449 through a capacity commutator 451. The current carried in the set is amplified but not rectified and the output of the set is connected with an inductance commutator 460 (details of which are described in my copending application Serial No. 322,338) and the field piece commutator 452 is also an inductance commutator the details of which are described in the above mentioned co-pending application. The compass or indicating unit generally indicated at D8 may be any one of the heretofore described forms of construction.

It was previously mentioned in the specification in connection with the formation of the compass rotor to vary the air gap density between the field pieces that the characteristics of the receiving set may not follow a true cosine curve. Fig. 23 indicates in full line the theoretical curve on which the rotor may be designed, and which for practical purposes will be sufficiently accurate. In cases where extreme accuracy is desired, however, the true curve for the receiving set may be determined and the rotor members designed and cut to conform to this curve. An example of the form which such a curve may take is shown in dotted lines in Fig. 23.

It will be apparent from the foregoing description that this invention embodies a radio direction and position indicator and method for using same, which may be either electromagnetically or electrostatically controlled, and by means of which results of extreme accuracy may be obtained. A unit embodying this invention may be made in extremely compact form, and the only time an operator is required is during the tuning of the instrument to locate the desired station.

It is suggested at this time that in tuning the instrument, when the general direction of the transmitting station is not known, it will not be immediately apparent to the operator whether the arrow end of the indicator is pointing toward or away from the station. This fact can be readily determined by introducing the earth capacity into one side of the set input in the well known manner, the introduction of this capacity on the side away from the station will be affective to substantially "cut out" the incoming signal according to the well known "cardioid effect".

When the direction of the broadcast station has thus been determined, if the arrow end of the indicator W² is not indicating the direction of the broadcast station, but is indicating a direction 180° therefrom, it may be manually turned 180° to indicate the direction of the station, where it will be held by the fields of force created by the energy received from said station. Means for accomplishing this result have been hereinbefore described and are shown in Fig. 6 of the drawings.

Many other uses for and variations in a compass system embodying my invention might be enumerated. For instance, a commutator system might be used to intermittently tune the receiver to receive waves from two transmitters at opposite ends of a course along which the vehicle carrying the instrument is travelling and the output thereof commutated to a single compass. If the indicator remains stationary the indication would be that the vehicle is traveling on a direct line between the two transmitters, vibrations of the needle would show that the vehicle is off the course and would indicate the extent and direction of the variation from the true course.

If the indicator member remains stationary and at one side or the other of the diamond point on the indicator scale which lies on the longitudinal axis of the vehicle, the subtended angle between the indicator member and the diamond point will indicate the drift angle.

While the present invention is based on direction indication, and it has been described that the indicator needle will swing into the line of direction to the source of the received energy, it will of course be understood that this will occur only when the indicator needle is in a horizontal position. However, the indicator needle will always turn to the same position on the dial when indicating the same line of direction, regardless of the position of the instrument, and therefore when the face of the instrument is not disposed horizontally, as when the instrument is mounted on an instrument board, it should be arranged so that the needle will be in an upright position when the vehicle is headed along the line of direction indicated by the indicator needle of the instrument.

It will be understood therefore that although I have herein described and illustrated the invention in various arrangements of systems, and indicated certain methods of use, that the invention is not necessarily limited to any one of the forms set forth in the description but is to include such changes, variations or modifications as may fairly come within the spirit of the appended claims.

I claim as my invention:

1. An apparatus for indicating the direction between a point and a source of radio energy embodying: a plurality of angularly disposed directional antennæ; tuning and amplifying means in operative relation with said antennæ; a plurality of diametrically disposed sets of electromagnetic field pieces arranged in predetermined angular relation with said antennæ; a rotatable flux carrying member disposed between the pole faces of said field pieces; indicating means in operative relations with said flux carrying member; and means for electrically connecting each set of field poles through said tuning and amplifying means with one of said antennæ.

2. An apparatus for indicating the direction between a point and a source of radio energy embodying: a plurality of angularly disposed directional antennæ; tuning and amplifying means in operative relation with said antennæ; a plurality of diametrically disposed sets of electromagnetic field pieces arranged in predetermined angular relation with said antennæ; a rotatable flux carrying member disposed between the pole faces of said field pieces; indicating means in operative relation with said flux carrying member; and means for alternately, electrically connecting each set of field pieces, through said tuning and amplifying means with the antenna with which said set of field pieces is parallel.

3. An apparatus for indicating the direction between a point and a source of radio energy embodying: a plurality of angularly disposed directional antennæ; a single tuning and amplifying set in operative relation with said antennæ; a plurality of diametrically disposed sets of electromagnetic field pieces arranged in predetermined angular relation with said antennæ; a rotatable flux carrying member disposed between the pole faces of said field pieces; indicating means in operative relation with said flux carrying member; and commutating means for electrically connecting each set of field pieces, intermittently through said tuning and amplifying set with one of said antennæ.

4. An apparatus for indicating the direction between a point and a source of radio energy embodying: a plurality of angularly disposed directional antennæ; tuning and amplifying means in operative relation with said antennæ; a plurality of diametrically disposed sets of electro-static field pieces arranged in predetermined angular relation with said antennæ; a rotatable flux carrying member disposed between the pole faces of said field pieces; indicating means in operative relation with said flux carrying member; and means for electrically connecting each set of field pieces, through said tuning and amplifying means with one of said antennæ said field piece members being U-shaped and arranged with like poles diametrically opposed.

5. An apparatus for indicating the direction between a point and a source of radio energy embodying: a plurality of angularly disposed directional antennæ; tuning and amplifying means in operative relation with said antennæ; a plurality of diametrically disposed sets of electrostatic field pieces arranged in predetermined angular relation with said antennæ; a rotatable flux carrying member disposed between the pole faces of said field pieces; indicating means in operative relation with said flux carrying member; and means for electrically connecting each set of field pieces through said tuning and amplifying means with one of said antennæ, said field piece members being U-shaped and arranged with like poles diametrically opposed, said flux carrying member being shaped to equalize the air gap density between the poles of said field piece members.

6. An apparatus for indicating the direction between a point and a source of radio energy embodying: a plurality of angularly disposed directional antennæ; tuning and amplifying means in operative relation with said antennæ; a plurality of diametrically disposed sets of electrostatic field pieces arranged in predetermined angular relation with said antennæ; a rotatable flux carrying member disposed between the pole faces of said field pieces; direction indicating means in operative relation with said flux carrying member; mechanical means for imparting rotative adjustment to said indicating means; and means for electrically connecting each set of field pieces through said tuning and amplifying means with one of said antennæ.

7. An apparatus for indicating the direction between a point and a source of radio energy embodying: a plurality of angularly disposed directional antennæ; a plurality of diametrically disposed sets of electro-static field pieces arranged in predetermined angular relation with said antennæ; tuning and amplifying means operatively connecting said directional antennæ with their relatively parallel field pieces to energize said field pieces; a flux carrying member rotatably mounted between the pole faces of said field pieces; and indicating means in operative relation with said flux carrying member.

8. An apparatus for indicating the direction between a point and a source of radio energy embodying: a plurality of angularly disposed directional antennæ; a plurality of diametrically disposed sets of electro-static field pieces arranged in predetermined angular relation with said antennæ; tuning and amplifying means operatively connecting said directional antennæ and said field pieces to energize said field pieces proportionately with the radio current induced in the corresponding antennæ; a flux carrying member rotatably mounted between the pole faces of said field pieces; and indicating means in operative relation with said flux carrying member, said field pieces being U-shaped, and said flux carrying member being shaped to equalize the air gap density between the pole faces on said field pieces.

9. An apparatus for indicating direction between a point and a source of radio energy embodying: a plurality of angularly disposed directional antennæ; a radio tuning and amplifying means; antenna commutating means to intermittently complete an electrical circuit between each of said antennæ and said tuning and amplifying means; a plurality of field pieces arranged in predetermined angular relation with said antennæ; field piece commutating means synchronized with said antenna commutating means to energize the respective field pieces from said tuning and amplifying means; a flux carrying member rotatably mounted between said field pieces; and an indicator in operative relation with said flux carrying member.

10. An electrically controlled system for indicating the direction from a point to a source of radio energy embodying: a plurality of angularly disposed directional antennæ; a plurality of electro-static field pieces connected with and arranged in predetermined angular relation with said antennæ; a flux carrying member rotatably disposed between said field pieces; and direction indicating means associated with said flux carrying member.

11. An electrically controlled system for indicating the direction between a point and a source of radio energy embodying: a plurality of angularly disposed directional antennæ; a plurality of electro-static field pieces arranged in predetermined angular relation with said antennæ; a flux carrying member rotatably disposed between said field pieces; direction indicating means in operative relation with said flux carrying member; and means connecting said field pieces and their respective antennæ for energizing said field pieces proportionate to a current induced in the respective antennæ with which said field pieces are parallel.

12. An electrically controlled system for indicating the direction between a point and a source of radio energy embodying a plurality of angularly disposed directional antennæ; a plurality of electro-static field pieces connected to and arranged in predetermined angular relation with said antennæ; a rotatable flux carrying member disposed between said field pieces; direction indicating means in operative relation with said flux carrying member; and tuning and amplifying means included in said connection between said field pieces and said antennæ for delivering electrical energy to said field pieces.

13. An electrically controlled system for indicating the direction between a point and a source of radio energy embodying a plurality of angularly disposed directional antennæ; a plurality of field pieces arranged in predetermined angular relation with said antennæ; a flux carrying member rotatably disposed between said field pieces; direction indicating means in operative relation with said flux carrying member; tuning and amplifying means interposed between said field pieces and said antennæ for delivering electrical energy to said field pieces; and commutating means for intermittently completing an electrical circuit from each of said antennæ, through said tuning and amplifying means to corresponding field pieces.

14. An electrically controlled system for indicating the direction between a point and a source of radio energy embodying a plurality of angularly disposed directional antennæ; a plurality of electro-static field pieces connected to and arranged in predetermined angular relation with said antennæ; a flux carrying member rotatably disposed between said field pieces; and direction indicating means in operative relation with said flux carrying member, said flux carrying member being shaped to vary the air gap density between the field pieces proportionately with the receiving characteristics of the directional antennæ with which the respective field pieces are associated.

15. An electrically controlled system for indicating the direction between a point and a source of radio energy embodying a plurality of angularly disposed directional antennæ; a plurality of sets of electro-static field pieces connected to and arranged in predetermined angular relation with said antennæ; a flux carrying member rotatably disposed between said field pieces; and direction indicating means in operative relation with said flux carrying member, said flux carrying member being shaped to vary the air gap density between relative sets of field pieces substantially in accordance with a cosine curve.

16. An electrically controlled system for indicating the direction between a point and a source of radio energy embodying a plurality of angularly disposed directional antennæ; tuning and amplifying means connected with said antennæ; a plurality of electro-static field pieces arranged in predetermined angular relation with said antennæ; means for electrically energizing said field pieces from said tuning and amplifying means; a rotatable flux carrying member interposed between said field pieces, said flux carrying member being shaped to vary the air gap density between the field pieces proportionately with the receiving characteristics of the directional antennæ with which said field pieces are associated and to compensate for the characteristics of the tuning and amplifying means; and direction indicating means in operative relation with said flux carrying member.

17. An electrically controlled system for indicating directions between a point and a plurality of sources of radio energy embodying: a plurality of angularly disposed directional antennæ; tuning and amplifying means connected with said antennæ; a plurality of banks of electro-static field pieces, the individual field pieces of which are in predetermined angular relation with said antennæ; rotatable flux carrying member disposed in each bank of field pieces; indicating means in operative relation with each of said flux carrying members; and means for electrically energizing each of said banks of field pieces from said tuning and amplifying means, said tuning and amplifying means being connected with the banks of field pieces to electrically energize each of said banks from a different source of radio energy.

18. An electrically controlled system for indicating directions between a point and a plurality of sources of radio energy embodying: a plurality of angularly disposed directional antennæ; a single amplifying set connected with said antennæ; a plurality of banks of electro-static field pieces, the individual field pieces of which are in predetermined angular relation with said antennæ; a rotatable flux carrying member disposed in each bank of field pieces; indicating means in operative relation with each of said flux carrying members; and means for electrically energizing each of said banks of field pieces from said amplifying set, commutator tuning means operatively connected with the amplifying set and the banks of field pieces to electrically energize each of said banks from a different source of radio energy.

19. A method of indicating the direction between a point and a source of electro-magnetic energy which includes receiving said electro-magnetic energy, generating by said received energy bidirectional electro-static fields of force, the effect of which is a single field of force bearing a predetermined relation to the direction between said point and said source, and utilizing solely and exclusively said single field effect to visually indicate the line of direction between said point and said source.

20. A method of indicating the direction from a point to a source of electro-magnetic energy which includes receiving said electro-magnetic energy, generating by said received energy electro-static fields of force, the effect of which is a single field of force bearing a predetermined relation to the direction between said point and said source, utilizing solely and exclusively said single field effect to visually indicate the line of direction between said point and said source, introducing earth capacity into said received energy, and indicating the effect thereof upon the received energy which produces the field of force, whereby the direction of travel of the received energy along said line of direction is established.

21. A method of indicating the direction between a point and a source of electro-magnetic energy which includes, receiving said electro-magnetic energy, generating by said received energy electro-static fields of force having the effect of two fields of force each bearing a predetermined relation with the direction between the said point and the source of said electro-magnetic energy, and utilizing solely and exclusively said field effects to indicate the said direction.

22. A method of indicating the direction between a point and a source of electro-magnetic energy which includes, directionally and simultaneously receiving said electro-magnetic energy separately in different amounts, generating by said received electro-magnetic energy separate electric currents, amplifying said currents, generating by said amplified currents electro-static fields of force having the effect of two fields of force each bearing a predetermined relation with the direction between the said point and the source of electro-magnetic energy, and utilizing solely and exclusively said field effects to indicate the said direction.

23. A method of indicating the direction between a point and a source of electro-magnetic energy which includes, directionally and simultaneously receiving said electro-magnetic energy separately in different amounts, amplifying said different amounts of energy, generating by said amplified energies electro-static fields of force having the effect of two fields of force each bearing a predetermined relation with the direction between the said point and the source of electro-magnetic energy, and utilizing solely and exclusively said field effects to indicate the said direction.

24. An apparatus for indicating the direction between a point and a source of electro-magnetic energy comprising means for receiving said electro-magnetic energy, means for generating by said received energy electro-static fields of force having the effect of two fields of force each bearing a predetermined relation with the direction between the said point and the source of said electro-magnetic energy, and means including a flux-carrying member actuated solely by said field effects to indicate the said direction.

25. An apparatus for indicating the direction between a point and a source of electro-magnetic energy comprising means for receiving said electro-magnetic energy, means for generating by said received energy electro-static fields of force having the effect of two fields of force each bearing a predetermined relation with the direction between the said point and the source of said electro-magnetic energy, and means including a flux-carrying member actuated solely by said field effects to visually indicate the said direction.

26. An apparatus for indicating the direction between a point and a source of electro-magnetic energy comprising means for receiving said electro-magnetic energy, means for generating by said received energy electro-static fields of force having the effect of two fields of force each bearing a predetermined relation with the direction between the said point and the source of said electro-magnetic energy, and means including a flux-carrying member for utilizing said field effects to visually indicate the direction between said point and said source, said flux-carrying member and fields of force being mutually associated so that said fields of force act directly and independently upon the flux-carrying member to actuate the same to indicate the said direction.

27. An apparatus for indicating the direction between a point and a source of electro-magnetic energy which includes, means for directionally and simultaneously receiving said electro-magnetic energy separately in different amounts, means for generating by said received electro-magnetic energy separate electric currents, means for amplifying said currents, means for generating by said amplified currents electro-static fields of force having the effect of two fields of force each bearing a predetermined relation with the direction between the said point and said source, and means for utilizing solely and exclusively said field effects to move a flux-carrying member to indicate the said direction.

28. An apparatus for indicating the direction between a point and a source of electro-magnetic energy which includes, means for directionally and simultaneously receiving said electro-magnetic energy separately in different amounts, means for amplifying said different amounts of energy, means for generating by said amplified energies electro-static fields of force having the effect of two fields of force each bearing a predetermined relation with the direction between the said point and said source, and means for utilizing solely and exclusively said field effects to move a flux-carrying member to indicate the said direction.

29. An apparatus for indicating the direction from a point and a source of radio energy embodying a plurality of angularly disposed directional antennæ, tuning and amplifying means in operative relation with said antennæ, a plurality of diametrically disposed sets of field pieces arranged in predetermined angular relation with said antennæ, a rotatably flux-carrying member disposed between the pole faces of said field pieces, indicating means in operative relation with said flux-carrying member, and means for electrically connecting each set of field pieces through said tuning and amplifying means with one of said antennæ.

30. An apparatus for indicating the direction between a point and a source of radio energy embodying a plurality of angularly disposed directional antennæ, tuning and amplifying means in operative relation with said antennæ, a plurality of diametrically disposed sets of field pieces arranged in predetermined angular relation with said antennæ, a rotatable flux-carrying member disposed between the pole faces of said field pieces, indicating means in operative relation with said flux-carrying member, and means for alternately, electrically connecting each set of field pieces through said tuning and amplifying means with the antenna with which said set of field pieces is parallel.

31. An apparatus for indicating the direction between a point and a source of radio energy embodying a plurality of angularly disposed directional antennæ, a single tuning and amplifying set in operative relation with said antennæ, a plurality of diametrically disposed sets of field pieces arranged in predetermined angular relation with said antennæ, a rotatably flux-carrying member disposed between the pole faces of said field pieces, indicating means in operative relation with said flux-carrying member, and commutating means for electrically connecting each set of field pieces intermittently through said tuning and amplifying set with one of said antennæ.

32. An apparatus for indicating the direction between a point and a source of radio energy embodying a plurality of angularly disposed directional antennæ, tuning and amplifying means in operative relation with said antennæ, a plurality of diametrically disposed sets of field pieces arranged in predetermined angular relation with said antennæ, a rotatable flux-carrying member disposed between the pole faces of said field pieces, indicating means in operative relation with said flux-carrying member, and means for electrically connecting each set of field pieces through said tuning and amplifying means with one of said antennæ, said field piece members being U-shaped and arranged with unlike poles diametrically opposed.

33. An apparatus for indicating the direction between a point and a source of radio energy embodying a plurality of angularly disposed directional antennæ, tuning and amplifying means in operative relation with said antennæ, a plurality of diametrically disposed sets of field pieces arranged in predetermined angular relation with said antennæ, a rotatable flux-carrying member disposed between the pole faces of said field pieces, indicating means in operative relation with said flux-carrying member, and means for electrically connecting each set of field pieces through said tuning and amplifying means with one of said antennæ, said field piece members being U-shaped and arranged with unlike poles diametrically opposed, said flux-carrying member being shaped to equalize the air gap density between the poles of said field piece members.

34. An electrically controlled system for indicating the direction between a point and a source of radio energy embodying a plurality of angularly disposed directional antennæ, a plurality of electro-static field pieces arranged in predetermined angular relation with said antennæ, a flux-carrying member rotatably disposed between said field pieces, direction indicating means in operative relation with said flux-carrying member, tuning and amplifying means interposed between said field pieces and said antennæ for delivering electrical energy to said field pieces, and commutating means for intermittently completing an electrical circuit from each of said antennæ, through said tuning and amplifying means to corresponding field pieces.

35. An electrically controlled system for indicating directions between a point and a plurality of sources of radio energy embodying a plurality of angularly disposed directional antennæ, a single amplifying set connected with said antennæ, a plurality of banks of field pieces, the individual field pieces of which are in predetermined angular relation with said antennæ, a rotatable flux-carrying member disposed in each bank of field pieces, indicating means in operative relation with each of said flux-carrying members, and means for electrically energizing each of said banks of field pieces from said amplifying set, commutator tuning means operatively connected with the amplifying set and the banks of field pieces to electrically energize each of said banks from a different source of radio energy.

36. An electrically controlled system for indicating directions between a point and a plurality of sources of radio energy embodying a plurality of angularly disposed directional antennæ, a single amplifying set connected with said antennæ, a plurality of banks of electro-magnetic field pieces, the individual field pieces of which are in predetermined angular relation with said antennæ, a rotatable flux-carrying member disposed in each bank of field pieces, indicating means in operative relation with each of said flux-carrying members, and means for electrically energizing each of said banks of field pieces from said amplifying set, commutator tuning means operatively connected with the amplifying set and the banks of field pieces to electrically energize each of said banks from a different source of radio energy.

37. An indicator unit for use in combination with a radiodynamic system for determining direction, embodying a plurality of sets of diametrically disposed U-shaped electro-static field pieces, a flux-carrying member rotatably mounted between the poles faces of said field pieces, and an indicator member actuated by the flux carrying member.

38. An indicator unit for use in combination with a radiodynamic system for determining direction, embodying a plurality of sets of diametrically disposed U-shaped electro-static field pieces, a flux-carrying member rotatably mounted between the pole faces of said field pieces, said field pieces and flux-carrying member being relatively disposed so that the fields of force are at right angles to the direction of rotation of said flux-carrying member, and an indicator member actuated by said flux-carrying member.

39. An indicator unit for use in combination with a radiodynamic system for determining direction, embodying a plurality of sets of diametrically disposed U-shaped electro-static field pieces, and a flux-carrying member rotatably mounted between the pole faces of said field pieces, and said field pieces being electrically connected in sets so that like polarity of the pole faces are diametrically opposite.

40. An indicator unit for use in combination with a radiodynamic system for determining direction, embodying a plurality of sets of diametrically disposed U-shaped electro-static field pieces, and a flux-carrying member rotatably mounted between the pole faces of said field pieces, said field pieces being electrically connected in sets so that unlike polarity of the pole faces are diametrically opposite and said flux-carrying member being constructed to provide pairs of equal reluctance between the unlike pole faces of the field pieces to stop the rotation of the flux-carrying member when said flux-carrying member rotates into the resultant field of the field pieces.

41. An apparatus for indicating the direction between a point and a source of radio energy embodying, a plurality of angularly disposed directional antennæ, tuning and amplifying means in operative relation with said antennæ, a plurality of diametrically disposed sets of electro-static field pieces arranged in predetermined angular relation with said antennæ, a rotatable flux-carrying member disposed between the pole faces of said field pieces, indicating means in operative relation with said flux-carrying member, and means for electrically connecting each set of field pieces, through said tuning and amplifying means with one of said antennæ said field piece members being U-shaped and arranged in predetermined mutual relation.

42. An apparatus for indicating the direction between a point and a source of radio energy embodying, a plurality of angularly disposed directional antennæ, tuning and amplifying means in operative relation with said antennæ, a plurality of diametrically disposed sets of electro-static field pieces arranged in predetermined angular relation with said antennæ, a rotatable flux-carrying member disposed between the pole faces of said field pieces, indicating means in operative relation with said flux-carrying member, and means for electrically connecting each set of field pieces through said tuning and amplifying means with one of said antennæ, said field piece members being U-shaped and arranged in predetermined mutual relation, said flux-carrying member being shaped to equalize the air gap density between the poles of said field piece members.

43. An indicator unit for use in combination with a radiodynamic system for determining direction embodying a plurality of sets of U-shaped diametrically disposed electro-static field pieces, a flux-carrying member rotatably mounted between the pole faces of said field pieces, said field pieces being electrically connected in sets, and an indicator member actuated by the flux-carrying member.

In testimony whereof, I have hereunto set my hand at Los Angeles, California, this 5th day of March, 1929.

WARREN S. EATON.